United States Patent
Kagei et al.

(10) Patent No.: US 10,442,699 B2
(45) Date of Patent: Oct. 15, 2019

(54) METHOD OF MANUFACTURING A POSITIVE ELECTRODE ACTIVE MATERIAL FOR LITHIUM SECONDARY BATTERIES

(75) Inventors: Shinya Kagei, Takehara (JP); Yoshimi Hata, Takehara (JP); Yasuhiro Ochi, Takehara (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 13/997,891

(22) PCT Filed: Dec. 19, 2011

(86) PCT No.: PCT/JP2011/079312
§ 371 (c)(1),
(2), (4) Date: Sep. 20, 2013

(87) PCT Pub. No.: WO2012/090749
PCT Pub. Date: Jul. 5, 2012

(65) Prior Publication Data
US 2014/0010752 A1     Jan. 9, 2014

(30) Foreign Application Priority Data

Dec. 28, 2010    (JP) ................................ 2010-292553
Jul. 7, 2011    (JP) ................................ 2011-150607

(51) Int. Cl.
*C01D 15/02*     (2006.01)
*C01G 45/12*     (2006.01)
(Continued)

(52) U.S. Cl.
CPC ......... *C01D 15/02* (2013.01); *C01G 45/1221* (2013.01); *C01G 45/1242* (2013.01);
(Continued)

(58) Field of Classification Search
CPC ............... C01D 15/02; C01G 45/1221; C01G 45/1242; C01G 53/54; H01M 4/505; C01P 2006/82
(Continued)

(56) References Cited

U.S. PATENT DOCUMENTS 7,927,741 B2    4/2011   Takeuchi et al.
2003/0091900 A1*   5/2003   Numata ............. C01G 45/1242
                                                    429/224

(Continued)

FOREIGN PATENT DOCUMENTS

JP         09231963 A    9/1997
JP         10188979 A    7/1998
(Continued)

OTHER PUBLICATIONS

Oder et al., "High Gradient Magnetic Separation Theory and Applications," IEEE Transactions on Magnetics 12(5), pp. 428-435, Sep. 1976.*

(Continued)

*Primary Examiner* — Jun Li
(74) *Attorney, Agent, or Firm* — The Webb Law Firm

(57) ABSTRACT

Provided is a new method for producing a positive electrode active material for lithium secondary batteries, by which even in the case of washing a spinel type lithium transition metal oxide with water or the like, the service life characteristics can be further enhanced, and the concentration of magnetic substances can be effectively reduced. Suggested is a method for producing a positive electrode active material for lithium secondary batteries, the method including a water washing step of bringing a powder of a spinel type lithium transition metal oxide into contact with a polar solvent and thereby washing the powder; and a drying step of subsequently drying the powder by heating the powder to 300° C. to 700° C. in an atmosphere containing oxygen.

7 Claims, 1 Drawing Sheet

(51) Int. Cl.
*C01G 53/00* (2006.01)
*H01M 4/505* (2010.01)

(52) U.S. Cl.
CPC .......... *C01G 53/54* (2013.01); *C01P 2006/80* (2013.01); *C01P 2006/82* (2013.01); *H01M 4/505* (2013.01)

(58) Field of Classification Search
USPC .................................................. 423/594.15
See application file for complete search history.

(56) References Cited

U.S. PATENT DOCUMENTS

| | | | | |
|---|---|---|---|---|
| 2003/0232223 | A1* | 12/2003 | Leddy | B01D 39/04 429/10 |
| 2006/0234126 | A1* | 10/2006 | Kolosnitsyn | H01M 4/0404 429/231.95 |
| 2007/0281212 | A1* | 12/2007 | Thackeray | C01G 45/125 429/231.1 |
| 2009/0325058 | A1* | 12/2009 | Katayama | H01G 9/02 429/142 |
| 2011/0281168 | A1* | 11/2011 | Watanabe | H01M 4/525 429/223 |
| 2012/0012776 | A1 | 1/2012 | Kagei et al. | |

FOREIGN PATENT DOCUMENTS

| | | |
|---|---|---|
| JP | 10302795 A | 11/1998 |
| JP | 10340726 A | 12/1998 |
| JP | 11154512 A | 6/1999 |
| JP | 2004107095 A | 4/2004 |
| JP | 2004164988 A | 6/2004 |
| WO | 2008091028 A1 | 7/2008 |
| WO | 2010114015 A1 | 10/2010 |

OTHER PUBLICATIONS

Patoux et al., "High voltage nickel manganese spinel oxides for Li-ion batteries," Electrochimica Acta 53(12), pp. 4137-4145, May 2008.*

Kim et al., "Molten salt synthesis of LiNi0.5Mn1.5O4 spinel for 5 V class cathode material of Li-ion secondary battery," Electrochimica Acta 49(2), pp. 219-227, Jan. 2004.*

Kim et al., "Phase Transitions in Li1-δNi0.5Mn1.5O4 during Cycling at 5 V," Electrochemical and Solid State Letters 7(7), pp. A216-A220, May 2004.*

Kang et al., "Improved electrochemical properties of BiOF-coated 5 V spinel Li[Ni0.5Mn1.5]O4 for rechargeable lithium batteries," Journal of Power Sources 195(7), pp. 2023-2028, Apr. 2010.*

* cited by examiner

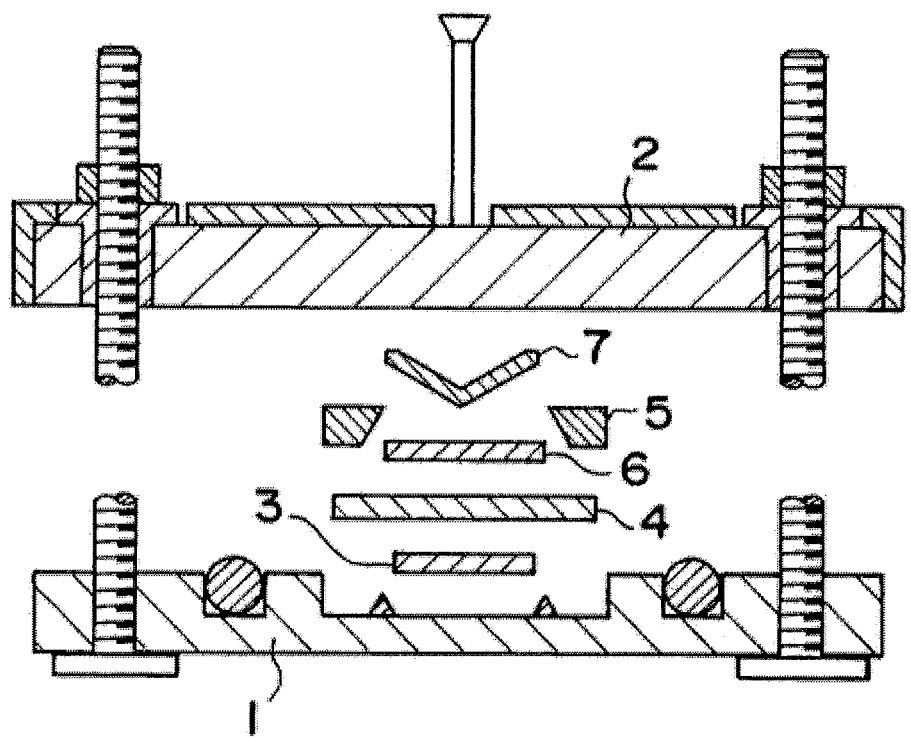

METHOD OF MANUFACTURING A POSITIVE ELECTRODE ACTIVE MATERIAL FOR LITHIUM SECONDARY BATTERIES

CROSS-REFERENCE TO RELATED APPLICATIONS

This application is a United States national phase under 35 U.S.C. § 371 of International Application No. PCT/JP2011/079312 filed Dec. 19, 2011, entitled "Method of Manufacturing a Positive Electrode Active Material for Lithium Secondary Batteries", and claims priority under 35 U.S.C. § 119(a)-(d) to Japanese Patent Application Nos. 2010-292553, filed on Dec. 28, 2010, and 2011-150607 filed on Jul. 7, 2011 in the Japanese Intellectual Property Office, which are hereby incorporated by reference in their entirety.

TECHNICAL FIELD

The present invention relates to a method for producing a positive electrode active material for lithium secondary batteries, particularly a spinel type (Fd-3m) lithium transition metal oxide.

BACKGROUND ART

Lithium batteries, particularly lithium secondary batteries, have features such as high energy density and long service life, and are widely used as power supplies for electrical appliances such as a video camera, or for portable electronic equipment such as laptop computers and mobile telephones. Recently, application thereof to large-sized batteries that are mounted in electric vehicles (EV), hybrid electric vehicles (HEV) and the like has been anticipated.

A lithium secondary battery is a secondary battery having a structure in which, at the time of charging, lithium slips out in the form of ions from a positive electrode and then migrates to a negative electrode where the ions are stored, and at the time of discharging, lithium ions on the contrary return from the negative electrode to the positive electrode, and the higher energy density of the lithium secondary battery is known to be attributable to the potential of the positive electrode material.

As the lithium transition metal oxide that can be used as a positive electrode active material for lithium secondary batteries, lithium transition metal oxides having a layered structure, such as $LiCoO_2$, $LiNiO_2$ and $LiMnO_2$, and lithium transition metal oxides having a manganese-based spinel structure (Fd-3m), such as $LiMn_2O_4$ and $LiNi_{0.5}Mn_{1.5}O_4$, are known.

Among them, spinel type lithium transition metal oxides are inexpensive in terms of raw material cost, non-toxic and highly safe, and therefore, attention is paid to spinel type lithium transition metal oxides as a positive electrode active material for large-sized batteries such as electric vehicles (EV) or hybrid electric vehicles (HEV). Furthermore, while excellent power output characteristics are particularly required in batteries for EV's and HEV's, in this regard, spinel type lithium transition metal oxides which are capable of three-dimensional insertion and extraction of Li ions are particularly excellent in the power output characteristics, as compared with lithium transition metal oxides such as $LiCoO_2$ having a layered structure.

In regard to such spinel type lithium transition metal oxides, it is known that if impurities, particularly sulfides (sulfate radicals) such as $SO_4$ or alkali metals other than Li, are present in large amounts at the surface of the oxide particles, there are various adverse effects on the battery characteristics, such as a decrease in the cycle characteristics or storage characteristics.

Particularly, when a spinel type lithium transition metal oxide is produced using electrolytic manganese dioxide as a manganese raw material, because electrolytic manganese dioxide is produced in a manganese sulfate electrolyte bath, a relatively large amount of sulfides such as $SO_4$ come into existence at the surface of particles. Therefore, addressing this problem is important.

Thus, methods of removing impurities at the surface of particles by washing with water a spinel type lithium transition metal oxide obtained through calcination, have been hitherto employed (see, for example, Patent Documents 1 to 3).

CITATION LIST

Patent Document

Patent Document 1: Japanese Patent Application Laid-Open (JP-A) No. H10-340726
Patent Document 2: JP-A No. H10-188979
Patent Document 3: JP-A No. H10-302795

However, when the inventors repeated various tests, they found that if a powder of a spinel type lithium transition metal oxide is washed with water or the like, it is difficult to increase the service life characteristics to a higher level.

It was also found that only with washing such as described above, it is difficult to effectively decrease the concentration of a material that is regarded as a main cause of small short circuits (voltage drops), for example, a magnetic substance that magnetically attaches to a magnet (see PCT/JP2008/051702).

Thus, an object of the present invention is to attempt to provide a new method for producing a positive electrode active material for lithium secondary batteries, by which the service life characteristics can be further enhanced, and more preferably, the concentration of magnetic substances can be effectively decreased, even in the case where spinel type lithium transition metal oxides are washed with water or the like (referred to as "water washing").

SUMMARY OF THE INVENTION

The present invention suggests a method for producing a positive electrode active material for lithium secondary batteries, the method including a washing step of bringing a powder of a spinel type lithium transition metal oxide into contact with a polar solvent and thereby washing the powder; and a drying step of subsequently drying the powder by heating the powder to 300° C. to 700° C. in an atmosphere containing oxygen.

The present invention also suggests a method for producing a positive electrode active material for lithium secondary batteries, the method including a washing step of bringing a powder of a spinel type lithium transition metal oxide into contact with a polar solvent and thereby forming a slurry; a magnetic separation step of feeding the slurry obtained in the washing step into a wet type magnetic separator, collecting magnetic substances that have attached to a magnet, and thereby removing the magnetic substances; and a drying step of subsequently drying the slurry by heating the slurry to 300° C. to 700° C. in an atmosphere containing oxygen.

Meanwhile, the "spinel type lithium transition metal oxide" to which the present invention is directed includes a spinel type (Fd-3m) lithium transition metal oxide having an operating potential of about 4 V, as well as a 5 V-class spinel type (Fd-3m) lithium transition metal oxide (referred to as a "5 V-class spinel"). Representative examples of the 5 V-class spinel include, for example, $Li_{1.0}Mn_{1.5}Ni_{0.5}O_4$ which has acquired an operating potential of about 5 V by substituting a portion of the Mn sites in $LiMn_2O_4$ with another 3d transition metal (Cr, Co, Ni, Fe, or Cu).

According to the production methods suggested by the present invention, impurities such as sulfides that are present at the surface of particles can be eliminated by washing a spinel type lithium transition metal oxide obtained by calcination. Furthermore, even in the case where sintering aids such as a boron compound have been added, these sintering aids can be eliminated, and the battery characteristics can be further enhanced. Moreover, even in the case of water washing, the service life characteristics can be further enhanced, and by optionally adding a magnetic separation step, the concentration of magnetic substances can be effectively decreased.

DRAWING

The drawing is a schematic diagram of an electrochemical cell used in the Examples.

DETAILED DESCRIPTION AND BEST MODE(S) FOR CARRYING OUT THE INVENTION

Hereinafter, embodiments of the present invention will be described. However, the scope of the present invention is not intended to be limited to the embodiments described below.
<Present Production Method>
The method for producing a positive electrode active material for lithium secondary batteries according to the present embodiment (referred to as the "present production method") is a method for producing a positive electrode active material for lithium secondary batteries, the method including a raw material mixing step of mixing raw materials such as a manganese compound and a lithium salt; a calcination step of calcining the mixed raw materials; a water washing step of bringing a powder of the obtained spinel type (Fd-3m) lithium transition metal oxide into contact with a polar solvent such as water and thereby washing the powder; and a drying step of drying the powder by heating the powder to 300° C. to 700° C. in an atmosphere containing oxygen.

In the present production method, other steps such as a magnetic separation step can be further added as necessary.

However, in the present invention, the steps carried out until a powder of a spinel type (Fd-3m) lithium transition metal oxide is obtained, that is, to speak in connection with the present production method described above, steps up to the calcination step, are not particularly limited, and the powder can be obtained by an appropriate method. The present embodiment is intended only to illustrate a suitable example.

(Raw Material Mixing Step)

Regarding the starting raw material, at least a lithium raw material and a manganese raw material may be appropriately selected.

There are no particular limitations on the lithium raw material, and examples thereof include lithium salts, for example, lithium hydroxide (LiOH), lithium carbonate ($Li_2CO_3$), lithium nitrate ($LiNO_3$), $LiOH.H_2O$, lithium oxide ($Li_2O$), other fatty acid lithiums, and lithium halides. Among them, hydroxide, carbonate and nitrate of lithium are preferred.

Regarding the manganese raw material, any of manganese compounds such as manganese dioxide, trimanganese tetraoxide, dimanganese trioxide, and manganese carbonate, or a mixture including a combination of two or more kinds selected among these, can be used.

As manganese dioxide, chemically synthesized manganese dioxide (CMD), electrolytic manganese dioxide (EMD) obtainable by electrolysis, manganese carbonate, or natural manganese dioxide can be used. Among them, electrolytic manganese dioxide is preferred from the viewpoint that since it is produced in a manganese sulfate electrolyte bath as described above, a relatively large amount of sulfides such as $SO_4$ are present in the interior of particles, and therefore, the effects of the present invention can be further enhanced.

In the present embodiment, a magnesium raw material or an aluminum raw material can also be incorporated in addition to the aforementioned raw materials.

At this time, the magnesium raw material is not particularly limited, and for example, magnesium oxide (MgO), magnesium hydroxide ($Mg(OH_2)$), magnesium fluoride ($MgF_2$), magnesium nitrate ($Mg(NO_3)_2$) and the like can be used. Among them, magnesium oxide is preferred.

The aluminum raw material is not particularly limited. For example, aluminum hydroxide ($Al(OH)_3$), aluminum fluoride ($AlF_3$) and the like can be used, and among them, aluminum hydroxide is preferred.

Furthermore, a boron compound may also be incorporated. By adding a boron compound and performing calcination, sintering of the fine particles resulting from aggregation of the crystal grains of the spinel type lithium transition metal oxide can be promoted, and compact aggregate fine particles (secondary particles) can be formed, so that the packing density (tap density) can be increased. At the same time, since the production and growth of crystals of the spinel type lithium transition metal oxide can be promoted, the size of the crystallites of the spinel type lithium transition metal oxide can be increased, and the number of interfaces within the primary particles can be decreased so that the discharge capacity under high load discharge (3C) can be increased.

At this time, the boron compound is desirably a compound containing boron (B element). It can be speculated that a boron compound that is added before calcination may undergo a change in the form as a result of calcination, but it is difficult to accurately specify the form. However, since the relevant boron (B element) exists in a state of being eluted with water, it has been confirmed that the relevant B element is not a spinel-constituting element, and exists outside the spinel as a boron compound of a certain form. Therefore, boron (B element) does not exist in the spinel, and a clear concentration gradient of boron (B element) does not exist at the surface and in the interior of the crystal grains.

The boron compound accomplishes the role of promoting sintering of a spinel type lithium transition metal oxide, as the boron compound is added and calcined together when the spinel type lithium transition metal oxide is calcined as described above. Therefore, it is contemplated that similarly to the boron compound, a material having a melting point that is lower than or equal to the calcination temperature, for example, a compound such as a vanadium compound ($V_2O_5$), an antimony compound ($Sb_2O_3$) or a phosphorus compound ($P_2O_5$), can also obtain the same effect as the boron compound.

In addition to that, any material which is known as a starting raw material of a lithium transition metal oxide can be incorporated.

In regard to the mixing of the raw materials, there are no particular limitations on the method as long as uniform mixing can be achieved. For example, various raw materials may be added simultaneously or in an appropriate sequence using a known mixing machine such as a mixer, and the raw materials may be mixed under stirring by a wet method or a dry method. In the case of adding an element that is difficult to substitute, for example, aluminum, it is preferable to employ a wet mixing method.

An example of a dry mixing method may be, for example, a mixing method of using a precision mixing machine which rotates a mixed powder at a high speed.

On the other hand, an example of a wet mixing method may be a mixing method of adding a liquid medium such as water or a dispersant to perform wet mixing to obtain a slurry, and pulverizing the obtained slurry obtained with a wet pulverizer. It is particularly preferable to perform pulverization to a size on the order of submicrometers. When the raw materials are pulverized to a size on the order of submicrometers, and then are granulated and calcined, uniformity of the various particles before the calcination reaction can be increased, and reactivity can be enhanced.

(Granulation)

The raw materials mixed as described above may be calcined after being granulated to a predetermined size according to necessity. However, granulation is not essentially necessary.

The granulation method may be a wet method or a dry method as long as the various raw materials that have been pulverized in the previous process are dispersed within the granulated particles without being separated, and examples of the granulation method include an extrusion granulation method, a rolling granulation method, a fluidized granulation method, a mixing granulation method, a spray drying granulation method, a pressing forming granulation method, and a flake granulation method using a roll or the like. However, in the case of performing wet granulation, it is necessary to sufficiently dry the raw materials before calcination.

Regarding the drying method to be used in this case, the raw materials may be dried by a known drying method such as a spray heat drying method, a hot air drying method, a vacuum drying method, or a freeze drying method, and among others, a spray heat drying method is preferred. The spray heat drying method is preferably carried out using a thermal spray drying machine (spray dryer). When granulation is achieved using a thermal spray drying machine (spray dryer), the particle size distribution can be made sharper, and also, the secondary particles can be produced so as to have a form including aggregate particles (secondary particles) that are formed by aggregating in a round form.

(Calcination Step)

Regarding calcination, it is preferable to perform calcination, for example, in an atmosphere of air, at a temperature of 700° C. to 1050° C.; among others, at a temperature higher than or equal to 710° C. or lower than or equal to 920° C.; above all, at a temperature higher than or equal to 720° C. or lower than or equal to 950° C.; and particularly, at a temperature higher than or equal to 750° C. or lower than or equal to 940° C.

Meanwhile, this calcination temperature means the material temperature of a calcination product, which is measured by bringing a thermocouple into contact with the calcination product inside a calcination furnace.

The calcination time, that is, the time for maintaining the calcination temperature, may vary with the calcination temperature, but the calcination time is preferably set to 0.5 hours to 90 hours; among others, longer than or equal to 1 hour or shorter than or equal to 80 hours; and above all, longer than or equal to 5 hours or shorter than or equal to 30 hours.

There are no particular limitations on the kind of the calcination furnace. For example, calcination can be carried out using a rotary kiln, a static furnace, or a calcination furnace of another type.

(Cracking or Pulverization)

After calcination, if necessary, the obtained spinel type (Fd-3m) lithium transition metal oxide is preferably cracked or pulverized.

At this time, the extent of cracking or pulverization is preferably adjusted so as not to cause disintegration of the primary particles.

(Water Washing Step)

In the present production method, the powder of the spinel type (Fd-3m) lithium transition metal oxide (also referred to as the "present lithium transition metal oxide powder") obtained as described above is preferably brought into contact with a polar solvent, and washed with water so as to eliminate impurities that are contained in the powder.

Meanwhile, the present lithium transition metal oxide powder also includes a powder of a 5 V-class spinel as described above.

For example, the present lithium transition metal oxide powder and a polar solvent may be mixed and stirred to prepare a slurry, and the obtained slurry may be subjected to solid-liquid separation by filtration or the like, to eliminate impurities. At this time, the solid-liquid separation may be carried out in a subsequent step.

Meanwhile, a slurry means a state in which the present lithium transition metal oxide powder is dispersed in a polar solvent.

Regarding the polar solvent that is used for water washing, it is preferable to use water.

Water may be city water, but it is preferable to use ion exchanged water or pure water that has been passed through a filter or a wet magnetic separator.

The pH of water is preferably 5 to 9.

In regard to the liquid temperature at the time of water washing, since it has been confirmed that the battery characteristics become more satisfactory if the liquid temperature at the time of washing is low, from such a viewpoint, the liquid temperature is preferably 5° C. to 70° C.; among others, more preferably 60° C. or lower; and above all, particularly preferably 45° C. or lower. Also, particularly, the liquid temperature is even more preferably 30° C. or lower.

Regarding the reason why the battery characteristics become more satisfactory when the liquid temperature at the time of water washing is low, it can be speculated to be because if the liquid temperature is too high, lithium in the lithium transition metal oxide is ion-exchanged with the proton of ion-exchanged water, and thereby lithium slips out and affects the high temperature characteristics.

In regard to the amount of the polar solvent that is brought into contact with the present lithium transition metal oxide powder, it is preferable to adjust the amount of the polar solvent such that the mass ratio of the present lithium transition metal oxide powder to the polar solvent (also referred to as "slurry concentration") is 10 wt % to 70 wt %, and among others, it is more preferable to adjust the amount of the polar solvent such that the mass ratio is more than or equal to 20 wt % or less than or equal to 60 wt %, and above all, more than or equal to 30 wt % or less than or equal to 50 wt %. When the amount of the polar solvent is 10 wt % or more, impurities such as $SO_4$ can be easily eluted, and on the contrary, when the amount of the polar solvent is 60 wt % or less, a washing effect adequate for the amount of the polar solvent can be obtained.

(Magnetic Separation Step)

In the present production method, if necessary, it is preferable to carry out magnetic separation, that is, a treatment for removing the impurities that magnetically attach to a magnet from the present lithium transition metal oxide powder. By performing magnetic separation, impurities that cause a short circuit can be eliminated.

Such magnetic separation may be carried out at any time point during the present production method. For example, magnetic separation is preferably carried out after the water washing step, or after the final cracking or pulverization. When the magnetic separation is carried out after the final cracking or pulverization, the iron and the like that are incorporated as a result of the breakage of a cracking machine or a pulverizer can also be eventually eliminated.

The magnetic separation method may be any of a dry magnetic separation method of bringing the present lithium transition metal oxide powder in a dry state into contact with a magnet, and a wet magnetic separation method of bringing a slurry of the present lithium transition metal oxide powder into contact with a magnet.

From the viewpoint of the magnetic separation efficiency, a wet magnetic separation method is preferred since the present lithium transition metal oxide powder that is in a more dispersed state, in other words, in a state of being unaggregated, can be brought into contact with a magnet.

Meanwhile, in the case of performing magnetic separation after water washing, it is preferable to select a wet magnetic separation method from the viewpoint that the magnetic separation can be combined with the water washing step. On the contrary, in the case of performing the magnetic separation after the final cracking or pulverization, it is preferable to employ a dry magnetic separation method from the viewpoint that there is no need to dry the lithium transition metal oxide powder afterwards.

In the case of performing a wet magnetic separation method in combination with the water washing step, when the present lithium transition metal oxide powder and a polar solvent are mixed and stirred in the water washing step to obtain a slurry, the obtained slurry is fed to a wet type magnetic separator and subjected to magnetic separation in the magnetic separation step, and subsequently, the slurry is filtered, the impurities separated in the water washing step and the magnetic separation step can be collectively separated and removed from the present lithium transition metal oxide powder.

The structure of the wet type magnetic separator may be arbitrary. For example, a magnetic separator such as one having a configuration in which filter-shaped or fin-shaped magnets are installed inside a pipe, may be mentioned as an example.

The magnetic power of the magnet used for magnetic separation (: the magnetic power at the site where the present lithium transition metal oxide powder is brought into contact) is preferably 8,000 G to 17,000 G (Gauss), particularly more preferably greater than or equal to 10,000 G or less than or equal to 17,000 G, and above all, particularly more preferably greater than or equal to 12,000 G or less than or equal to 17,000 G. When the magnetic power of the magnet is 10,000 G or greater, a desired magnetic separation effect can be obtained, while when the magnetic power of the magnet is 17,000 G or less, elimination of even necessary components can be prevented.

When the present lithium transition metal oxide powder and a polar solvent are mixed and stirred to obtain a slurry in the water washing step, and the obtained slurry is fed to a wet type magnetic separator and subjected to magnetic separation in the magnetic separation step, from the viewpoint of increasing the magnetic separation efficiency, the supply rate of the slurry provided for the magnetic separation is preferably 0.2 m/sec to 3.0 m/sec; among others, preferably greater than or equal to 0.3 m/sec or less than or equal to 2.0 m/sec; and above all, preferably greater than or equal to 0.5 m/sec or less than or equal to 1.5 m/sec.

(Drying Step)

In the drying step, it is preferable to dry the powder by heating to 300° C. to 700° C. in an atmosphere containing oxygen. This temperature is the material temperature of the present lithium transition metal oxide powder.

In the case of water washing the powder of the obtained spinel type lithium transition metal oxide, when the powder was dried at about 200° C. as in conventional cases, it was difficult to further enhance the service life characteristics. In contrast, it was found that when a powder of a spinel type lithium transition metal oxide is washed with water, and then dried at an atmosphere temperature of 300° C. or higher, the service life characteristics can be further enhanced.

The drying temperature is preferably 300° C. to 700° C. as described above, and above all, it is preferable to set the drying temperature to a temperature of 340° C. or higher, or to a temperature region lower than a primary oxygen release temperature.

The "primary oxygen release temperature" means a temperature at which when a spinel type lithium transition metal oxide is heated, the oxide releases oxygen for the first time. For example, the "primary oxygen release temperature" can be determined by heating the spinel type lithium transition metal oxide, and measuring the temperature as an initiation temperature (° C.) for weight reduction in the range of 600° C. to 900° C.

It is preferable to heat the spinel type lithium transition metal oxide to a temperature region lower than the primary oxygen release temperature, because if the oxide is heated to a temperature higher than that, oxygen deficiency occurs.

Regarding the atmosphere for drying, it is preferable to carry out drying in an atmosphere containing oxygen, for example, in air.

Furthermore, since it is desirable to carry out drying in an atmosphere where humidity is also as low as possible, it is preferable to carry out the treatment at an average water vapor elimination rate of 0.008 g/sec to 300 g/sec; among others, greater than or equal to 0.5 g/sec or less than or equal to 200 g/sec; and above all, greater than or equal to 1.0 g/sec or less than or equal to 150 g/sec.

Meanwhile, the water vapor elimination rate is the amount of moisture that is contained in the powder of the spinel type lithium transition metal oxide and is to be evaporated, per unit time, and in the Examples described below, the water vapor elimination rate is calculated by measuring the time for which an amount equivalent to 15%, of the moisture contained in the powder of the spinel type lithium transition metal oxide can be evaporated.

(Classification)

After drying, it is preferable to perform classification after performing cracking or pulverization as necessary.

As described above, it is preferable to perform thereafter magnetic separation, and particularly a dry type magnetic separation method.

(Others)

In the present production method, it is preferable not to carry out a heat treatment of heating to a temperature of 700° C. or higher after the water washing. It is because when heating to a temperature of 700° C. or higher is not carried out after water washing, the possibility that the material may undergo re-sintering and adversely affect the battery characteristics can be eliminated.

<Characteristics and Application>

The lithium transition metal oxide obtained by the present production method can be effectively utilized as a positive electrode active material for lithium batteries (therefore, referred to as the "present positive electrode active material").

For example, a positive electrode mixture can be prepared by mixing the present positive electrode active material, an electroconductive material formed of carbon black or the like, and a binder formed of a TEFLON (registered trademark) binder or the like. Then, a lithium secondary battery can be constructed by using such a positive electrode mixture for the positive electrode, while using, for example, lithium or a material capable of storage and release of lithium, such as carbon, for the negative electrode, and using a solution prepared by dissolving a lithium salt such as lithium hexafluorophosphate ($LiPF_6$) in a mixed solvent of ethylene carbonate-dimethyl carbonate or the like, as a non-aqueous electrolyte. However, the present invention is not intended to be limited to a battery of such a configuration.

<Description of Terms>

In the present invention, a "lithium battery" means to include all kinds of batteries containing lithium or lithium ions within the battery, such as a lithium primary battery, a lithium secondary battery, a lithium ion secondary battery, and a lithium polymer battery.

Furthermore, in the case of the expression "X to Y" (X and Y are arbitrary numbers), unless particularly stated otherwise, the expression includes the meaning of "more than or equal to X and less than or equal to Y", as well as the meaning of "preferably more than X" or "preferably less than Y".

Moreover, in the case of the expression "more than or equal to X" (X is an arbitrary number) or "less than or equal to Y" (Y is an arbitrary number), it is also intended to imply that "it is preferably more than X" or "it is preferably less than Y".

EXAMPLES

Next, the present invention will be further described by way of Examples and Comparative Examples, but the present invention is not intended to be limited to the Examples that will be described below.

<Measurement of Primary Oxygen Release Temperature>

Measurement was made by weighing 40 mg of a lithium manganate powder, placing the powder in a basin container made of $Al_2O_3$, and heating the powder up to 1100° C. at a rate of temperature increase of 5° C./min, while air was caused to flow at a flow rate of 100 ml/min (oxygen partial pressure 0.021 MPa and oxygen concentration 21%). From the obtained TG curve, the initiation temperature of weight reduction was determined over the range of 600° C. to 900° C., as a "primary oxygen release temperature."

For the thermal analysis, a TG-DTA apparatus ("TG-DTA2000S" manufactured by MAC Science Co., Ltd.) was used.

<Chemical Analysis Measurement>

The amount of boron (B), the amount of sulfate radical ($SO_4$), the amount of sulfur (S), and the amount of Na in the lithium manganate powders (samples) obtained in Examples and Comparative Examples were measured by a conventional ICP emission spectroscopy method.

<Measurement of Amount of Moisture>

The amounts of moisture (ppm) in the lithium manganate powders (samples) obtained in Examples and Comparative Examples were measured using a coulometric titration type automatic moisture meter (Model CA-100, manufactured by Mitsubishi Chemical Corp.).

The range of measurement was set from normal temperature to 300° C.

<Measurement of Degree of Increase in Amount of Moisture>

The amounts of moisture in the lithium manganate powders (samples) obtained in Examples and Comparative Examples were left to stand for 45 minutes in an environmental testing instrument at 60° C.×humidity of 80% and then taken out, were measured using a coulometric titration type automatic moisture meter.

The numerical value determined by dividing the amount of moisture after storage by the initial amount of moisture, was determined as the degree of increase in the amount of moisture (%).

<Battery Evaluation>

(Production of Battery)

8.80 g of the lithium manganate powder (sample) obtained in each of Examples and Comparative Examples or a 5 V-class spinel powder (sample), 0.60 g of acetylene black (manufactured by Denki Kagaku Kogyo K.K.), and 5.0 g of a liquid prepared by dissolving 12 wt % of PVDF (manufactured by Kishida Chemical Co., Ltd.) in NMP (N-methylpyrrolidone) were accurately measured, and 5 ml of NMP was added thereto. The mixture was sufficiently mixed, and thus a paste was produced. This paste was applied on an aluminum foil which was a current collector, and a coating film was formed with an applicator with the gap adjusted to 250 μm. The paste was dried in a vacuum for one whole day and night at 120° C., and then the assembly was punched out to have a diameter of 16 mm and compressed to 4 t/cm². Thus, a positive electrode was obtained. Immediately before the production of a battery, the positive electrode was dried in a vacuum at 120° C. for 120 minutes or longer to eliminate any attaching moisture, and the positive electrode was incorporated into the battery. Furthermore, the average value of the weight of the aluminum foil having a diameter of 16 mm was determined in advance, and the weight of the aluminum foil was subtracted from the weight of the positive electrode to determine the weight of the positive electrode mixture material. Also, the content of the positive electrode active material was determined from the mixing ratio of the positive electrode active material, acetylene black, and PVDF.

A negative electrode was produced with lithium metal having a diameter of 20 mm×a thickness of 1.0 mm, and by using these materials, a cell for electrochemical evaluation, TOMCEL (registered trademark), as illustrated in FIG. 1 was produced.

The electrochemical cell illustrated in the drawing was configured such that a positive electrode 3 formed from the positive electrode mixture material described above was disposed at the inner center of a lower body 1 made of a stainless steel that was resistant to organic electrolyte solutions. On the top surface of this positive electrode 3, a separator 4 made of a finely porous polypropylene resin, which had been impregnated with an electrolyte solution, was disposed, and the separator was fixed thereto using a TEFLON (registered trademark) spacer 5. Furthermore, on the top surface of the separator, a negative electrode 6 formed from lithium metal was disposed downward, and a spacer 7 which also functioned as a negative electrode terminal was disposed thereon. An upper body 2 was covered thereon, and the bodies were firmly joined with bolts, and thus the cell was tightly sealed.

As the electrolyte solution, a solution prepared by using a mixture of EC and DMC at a volume ratio of 3:7 as a solvent, and dissolving therein $LiPF_6$ as a solute at a concentration of 1 mol/L, was used.

(Initial Discharge Capacity)

Using the electrochemical cell prepared as described above, the initial discharge capacity was determined by a method that will be described below. That is, while the cell was charged at 0.1 C up to 4.3 V at 20° C., the current value that would give a discharge rate of 0.1 C was calculated from the content of the positive electrode active material in the positive electrode. The discharge capacity (mAh/g) obtainable when the cell was subjected to constant current discharge to 3.0 V was measured.

Meanwhile, in regard to the 5 V-class spinel powder (sample), while the cell was charged at 0.1 C up to 5.2 V at 20° C., the current value that would give a discharge rate of 0.1 C was calculated from the content of the positive electrode active material in the positive electrode. The discharge capacity (mAh/g) obtainable when the cell was subjected to constant current discharge to 3.0 V was measured.

Furthermore, the high temperature characteristics evaluation was carried out by the following method.

8.80 g of the lithium manganate powder (sample) obtained as a positive electrode active material in each of Examples and Comparative Examples or a 5 V-class spinel powder (sample), 0.60 g of acetylene black (manufactured by Denki Kagaku Kogyo K.K.), and 5.0 g of a liquid prepared by dissolving 12 wt % of PVDF (manufactured by Kishida Chemical Co., Ltd.) in NMP (N-methylpyrrolidone) were accurately measured, and 5 ml of NMP was added thereto. The mixture was sufficiently mixed, and thus a paste was produced. This paste was applied on an aluminum foil which was a current collector, and a coating film was formed with an applicator with the gap adjusted to 200 μm to 310 μm. The paste was dried in a vacuum for one whole day and night at 120° C., and then the assembly was punched out to have a diameter of 16 mm and compressed to 4 t/cm². Thus, a positive electrode was obtained. Immediately before the production of a battery, the positive electrode was dried in a vacuum at 120° C. for 120 minutes or longer to eliminate any attaching moisture, and the positive electrode was incorporated into the battery. Furthermore, the average value of the weight of the aluminum foil having a diameter of 16 mm was determined in advance, and the weight of the aluminum foil was subtracted from the weight of the positive electrode to determine the weight of the positive electrode mixture material. Also, the content of the positive electrode active material was determined from the mixing ratio of the positive electrode active material, acetylene black, and PVDF.

A negative electrode was produced from natural spherical graphite (Pionics Co., Ltd., electrode capacity 1.6 mAh/cm²) having a diameter of 17.5 mm, and the ratio of negative electrode capacity/positive electrode capacity was adjusted to 1.1 to 1.15. Regarding the electrolyte solution, a solution prepared by using a mixture of EC and DMC at a volume ratio of 3:7 to which VC was added at a proportion of 0.5% as a solvent, and dissolving therein $LiPF_6$ as a solute at a concentration of 1 mol/L, was used. Thus, a cell for electrochemical evaluation, TOMCEL (registered trademark), as illustrated in FIG. 1 was produced.

(Initial Activation Treatment)

A charge-discharge test was carried out by a method described below using the electrochemical cell prepared as described above, and an initial activation treatment was carried out. The initial activation treatment is essential for lithium ion batteries.

The cell was placed in an environmental testing instrument in which the environment temperature for battery charge-discharge was set to be 25° C., and the cell was made ready for charging and discharging. The cell was left to stand for one hour so that the cell temperature would be the same as the environment temperature, and then constant current constant voltage charging was carried out at 0.05 C for the first cycle, while the charge-discharge range was set to 3.0 V to 4.2 V for the lithium manganate powder (sample), and to 3.0 V to 5.1 V for the 5 V-class spinel powder (sample). The cell was subjected to aging for about 50 hours to 100 hours, and then the cell was subjected to two cycles, each cycle including constant current discharge at 0.05 C, subsequent constant current constant voltage charge at 0.1 C, and constant current discharge at 0.1 C.

(High Temperature Cycle Service Life Evaluation)

A charge-discharge test was carried out by a method described below using the electrochemical cell prepared as described above, and the high temperature cycle service life characteristics were evaluated.

The cell was placed in an environmental testing instrument in which the environment temperature for battery charge-discharge was set to be 45° C., and the cell was made ready for charging and discharging. The cell was left to stand for 4 hours so that the cell temperature would be the same as the environment temperature, and then one cycle of charge-discharge was carried out by performing constant current constant voltage charge at 1.0 C and constant current discharge at 0.1 C, while the charge-discharge range was set to 3.0 V to 4.2 V for the lithium manganate powder (sample), and to 3.0 V to 5.1 V for the 5 V-class spinel powder (sample). The charge-discharge cycle was carried out 99 times at 1 C at a charge-discharge depth of SOC of 0% to 100%, and on the 100$^{th}$ cycle, discharge was carried out at a discharge rate of 0.1 C so as to check the capacity.

The percent value (%) determined by dividing the discharge capacity of the 100$^{th}$ cycle by the discharge capacity of the first cycle, was determined as the high temperature cycle service life characteristic value (0.1 C).

(Power Output Retention Rate Before and after Cycles)

A charge-discharge test was carried out by a method described below using the electrochemical cell that had been subjected to the initial activation treatment, and the power output retention rate was determined.

A cell that had been subjected to an initial activation treatment was obtained by placing a cell in an environmental testing instrument set at 25° C., and performing the initial activation treatment. The initial power output was determined from the discharge capacity, by performing charging to obtain a SOC of 50%, and then performing discharging for 10 seconds at 3.0 C with an electrochemical analyzer. The cell that had been subjected to the cycle at a high temperature (45° C.) was set up for an environmental test at 25° C., and the power output after the cycle was determined by performing charging so as to obtain a SOC of 50%, and then performing discharging for 10 seconds at 3.0 C with an electrochemical analyzer.

The value determined by dividing the power output after 100 cycles by the initial power output, was determined as the "power output retention rate (%)".

Example 1

Lithium carbonate, electrolytic manganese dioxide (TG weight reduction at the time of heating to 200° C. to 400° C.: 3.0%), magnesium oxide, lithium tetraborate, and aluminum hydroxide were weighed to obtain the composition indicated in Table 1, and the materials were mixed with a precision mixing machine. Thereby, a mixed raw material was obtained.

The obtained mixed raw material was filled in a calcination vessel (crucible made of alumina, size=length*width*height=10*10*5 (cm)), such that the ratio of the open area and the packing height (open area $cm^2$/packing height cm) would be 100. The apparent density of the raw material at this time was 1.1 $g/cm^3$. The raw material was calcined for 15 hours at 900° C. in an electric furnace, and the calcination product was cracked with a shear crusher. Thus, a powder of spinel type lithium manganate was produced.

TABLE 1

|  | Example 1 | Comparative Example 1 | Example 5 | Example 6 | Example 7 | Example 8, | Example 9 |
|---|---|---|---|---|---|---|---|
| Li (mass %) | 4.3 | 4.2 | 3.8 | 4.3 | 4.3 | 4.3 | 4.3 |
| Mn (mass %) | 56.0 | 56.1 | 43.8 | 56.2 | 56.3 | 56.2 | 56.4 |
| Ni (mass %) | — | — | 15.5 | — | — | — | — |
| Al (mass %) | 1.2 | 1.2 | — | 1.2 | 1.2 | 1.2 | 1.2 |
| Mg (mass %) | 0.8 | 0.8 | — | 0.2 | 0.1 | 0.1 | 0.1 |
| B (mass %) | 0.08 | 0.08 | — | 0.08 | 0.08 | 0.16 | 0.24 |

7,000 g of this powder of spinel type lithium manganate and 13.5 L of ion-exchanged water (pH 5.8) were mixed, and the mixture was stirred for 10 minutes to obtain a slurry of lithium manganate (slurry concentration: 34% by mass). The liquid temperature at this time was 25° C. This slurry was passed through a wet type magnetic separator (magnetic power of the magnet at the site where the slurry is brought into contact: 17,000 G) at a speed of 1.0 m/sec, and then the slurry was filtered under reduced pressure.

Subsequently, lithium manganate separated by filtration was heated in air at 350° C. (material temperature), and was dried for 5 hours at a water vapor elimination rate of 1.0 g/sec. Subsequently, classification was carried out using a classifier, and thus a powder (sample) of lithium manganate having a size under 325 mesh was obtained.

Meanwhile, a portion of the powder of lithium manganate before being dried was collected and analyzed, and the primary oxygen release temperature thereof was 722° C.

Example 2

A powder (sample) of lithium manganate was obtained in the same manner as in Example 1, except that the temperature for water washing was changed to 50° C.

A portion of the powder of lithium manganate before being dried was collected and analyzed, and the primary oxygen release temperature thereof was 721° C.

Example 3

A powder (sample) of lithium manganate was obtained in the same manner as in Example 1, except that the drying temperature after magnetic separation was changed to 300° C., and the water vapor elimination rate was changed to 0.008 g/sec.

A portion of the powder of lithium manganate before being dried was collected and analyzed, and the primary oxygen release temperature thereof was 723° C.

Example 4

A powder (sample) of lithium manganate was obtained in the same manner as in Example 1, except that the slurry concentration after water washing was change to 50% by mass, the drying temperature after magnetic separation was changed to 400° C., and the water vapor elimination rate was changed to 150 g/sec.

A portion of the powder of lithium manganate before being dried was collected and analyzed, and the primary oxygen release temperature thereof was 722° C.

Example 5

Lithium carbonate, electrolytic manganese dioxide (TG weight reduction at the time of heating to 200° C. to 400° C.: 3.0%), and nickel hydroxide were weighed in the amounts indicated in Table 1 so that the total amount would be 10 kg, and the materials were introduced into 20 kg of water and 1.2 kg of a dispersant under stirring. The slurry was circulated in a wet type pulverizer (SC Mill SC220/70A-VB-ZZ, Mitsui Mining & Smelting Co., Ltd.) to pulverize the slurry at a speed of rotation of 1300 rpm for 45 minutes. Thus, the core particle size in the slurry was adjusted to 0.6 μm or less. The obtained slurry was dried with a spray thermal dryer (OC-16, Ohkawara Kakohki Co., Ltd.) at an atomizer rate of 24000 rpm, a flow rate of 50 mL/min, and an inlet temperature of 190° C. Thus, a precursor having a core particle size of 15 μm was obtained.

The obtained precursor was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm$^3$. The raw material was calcined for 72 hours at 950° C. in an electric furnace, and the calcination product was cracked with a shear crusher. Thus, a powder of spinel type lithium manganate (5 V-class spinel powder) was produced.

7,000 g of this 5 V-class spinel powder and 13.5 L of ion-exchanged water (pH 5.8) were mixed, and the mixture was stirred for 10 minutes to obtain a slurry of lithium manganate (slurry concentration: 34% by mass). The liquid temperature at this time was 25° C. This slurry was passed through a wet type magnetic separator (magnetic power of the magnet at the site where the slurry is brought into contact: 17,000 G) at a speed of 1.0 m/sec, and then the slurry was filtered under reduced pressure.

Subsequently, lithium manganate separated by filtration was heated in air at 500° C. (material temperature), and was dried for 5 hours at a water vapor elimination rate of 1.0 g/sec. Subsequently, classification was carried out using a classifier, and thus a 5 V-class spinel powder (sample) having a size under 325 mesh was obtained.

Meanwhile, a portion of the powder of the 5 V-class spinel powder before being dried was collected and analyzed, and the primary oxygen release temperature thereof was 730° C.

Example 6

Lithium carbonate, electrolytic manganese dioxide (TG weight reduction at the time of heating to 200° C. to 400° C.: 3.0%), magnesium oxide, lithium tetraborate, and aluminum hydroxide were weighed to obtain the composition indicated in Table 1, and the materials were mixed with a precision mixing machine. Thereby, a mixed raw material was obtained.

The obtained mixed raw material was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm$^3$. The raw material was calcined for 20 hours at 850° C. in an electric furnace, and the calcination product was cracked with a shear crusher. Thus, a powder of spinel type lithium manganate was produced.

7,000 g of this powder of spinel type lithium manganate and 13.5 L of ion-exchanged water (pH 5.8) were mixed, and the mixture was stirred for 10 minutes to obtain a slurry of lithium manganate (slurry concentration: 34% by mass). The liquid temperature at this time was 25° C. This slurry was passed through a wet type magnetic separator (magnetic power of the magnet at the site where the slurry is brought into contact: 17,000 G) at a speed of 1.0 m/sec, and then the slurry was filtered under reduced pressure.

Subsequently, lithium manganate separated by filtration was heated in air at 350° C. (material temperature), and was dried for 5 hours at a water vapor elimination rate of 50.0 g/sec. Subsequently, classification was carried out using a classifier, and thus a powder (sample) of lithium manganate having a size under 325 mesh was obtained. Meanwhile, a portion of the powder of lithium manganate before being dried was collected and analyzed, and the primary oxygen release temperature thereof was 705° C.

Example 7

Lithium carbonate, electrolytic manganese dioxide (TG weight reduction at the time of heating to 200° C. to 400° C.: 3.0%), magnesium oxide, lithium tetraborate, and aluminum hydroxide were weighed to obtain the composition indicated in Table 1, and the materials were mixed with a precision mixing machine. Thereby, a mixed raw material was obtained.

The obtained mixed raw material was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm$^3$. The raw material was calcined for 20 hours at 850° C. in an electric furnace, and the calcination product was cracked with a shear crusher. Thus, a powder of spinel type lithium manganate was produced.

7,000 g of this powder of spinel type lithium manganate and 13.5 L of ion-exchanged water (pH 5.8) were mixed, and the mixture was stirred for 10 minutes to obtain a slurry of lithium manganate (slurry concentration: 34% by mass). The liquid temperature at this time was 5° C. This slurry was passed through a wet type magnetic separator (magnetic power of the magnet at the site where the slurry is brought into contact: 17,000 G) at a speed of 1.0 m/sec, and then the slurry was filtered under reduced pressure.

Subsequently, lithium manganate separated by filtration was heated in air at 350° C. (material temperature), and was dried for 5 hours at a water vapor elimination rate of 1.0 g/sec. Subsequently, classification was carried out using a classifier, and thus a powder (sample) of lithium manganate having a size under 325 mesh was obtained. Meanwhile, a portion of the powder of lithium manganate before being dried was collected and analyzed, and the primary oxygen release temperature thereof was 700° C.

Example 8

Lithium carbonate, electrolytic manganese dioxide (TG weight reduction at the time of heating to 200° C. to 400° C.: 3.0%), magnesium oxide, lithium tetraborate, and aluminum hydroxide were weighed to obtain the composition indicated in Table 1, and the materials were mixed with a precision mixing machine. Thereby, a mixed raw material was obtained.

The obtained mixed raw material was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm$^3$. The raw material was calcined for 20 hours at 800° C. in an electric furnace, and the calcination product was cracked with a shear crusher. Thus, a powder of spinel type lithium manganate was produced.

7,000 g of this powder of spinel type lithium manganate and 13.5 L of ion-exchanged water (pH 5.8) were mixed, and the mixture was stirred for 10 minutes to obtain a slurry of lithium manganate (slurry concentration: 34% by mass). The liquid temperature at this time was 25° C. This slurry was passed through a wet type magnetic separator (magnetic power of the magnet at the site where the slurry is brought into contact: 17,000 G) at a speed of 1.0 m/sec, and then the slurry was filtered under reduced pressure.

Subsequently, lithium manganate separated by filtration was heated in air at 350° C. (material temperature), and was dried for 5 hours at a water vapor elimination rate of 1.0 g/sec. Subsequently, classification was carried out using a classifier, and thus a powder (sample) of lithium manganate having a size under 325 mesh was obtained. Meanwhile, a portion of the powder of lithium manganate before being dried was collected and analyzed, and the primary oxygen release temperature thereof was 700° C.

Example 9

Lithium carbonate, electrolytic manganese dioxide (TG weight reduction at the time of heating to 200° C. to 400° C.: 3.0%), magnesium oxide, lithium tetraborate, and aluminum hydroxide were weighed to obtain the composition indicated in Table 1, and the materials were mixed with a precision mixing machine. Thereby, a mixed raw material was obtained.

The obtained mixed raw material was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm$^3$. The raw material was calcined for 20 hours at 750° C. in an electric furnace, and the calcination product was cracked with a shear crusher. Thus, a powder of spinel type lithium manganate was produced.

7,000 g of this powder of spinel type lithium manganate and 13.5 L of ion-exchanged water (pH 5.8) were mixed, and the mixture was stirred for 10 minutes to obtain a slurry of lithium manganate (slurry concentration: 34% by mass). The liquid temperature at this time was 10° C. This slurry was passed through a wet type magnetic separator (magnetic power of the magnet at the site where the slurry is brought into contact: 17,000 G) at a speed of 1.0 m/sec, and then the slurry was filtered under reduced pressure.

Subsequently, lithium manganate separated by filtration was heated in air at 350° C. (material temperature), and was dried for 5 hours at a water vapor elimination rate of 120 g/sec. Subsequently, classification was carried out using a classifier, and thus a powder (sample) of lithium manganate having a size under 325 mesh was obtained. Meanwhile, a portion of the powder of lithium manganate before being dried was collected and analyzed, and the primary oxygen release temperature thereof was 695° C.

Comparative Example 1

Lithium carbonate, electrolytic manganese dioxide (TG weight reduction at the time of heating to 200° C. to 400° C.: 3.0%), magnesium oxide, lithium tetraborate, and aluminum hydroxide were weighed to obtain the composition indicated in Table 1, and the materials were mixed with a precision mixing machine. Thereby, a mixed raw material was obtained.

The obtained mixed raw material was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm$^3$. The raw material was calcined for 15 hours at 900° C. in an electric furnace, and the calcination product was cracked with a shear crusher. Classification was carried out using a classifier, and thus a powder of spinel type lithium manganate having a size under 325 mesh was produced.

Comparative Example 2

Lithium carbonate, electrolytic manganese dioxide (TG weight reduction at the time of heating to 200° C. to 400° C.: 3.0%), magnesium oxide, lithium tetraborate, and aluminum hydroxide were weighed in the same amounts as those used in Comparative Example 1, and the materials were mixed with a precision mixing machine. Thereby, a mixed raw material was obtained.

The obtained mixed raw material was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm$^3$. The raw material was calcined for 15 hours at 900° C. in an electric furnace, and the calcination product was cracked with a shear crusher. Thus, a powder of spinel type lithium manganate was produced.

7,000 g of this powder of spinel type lithium manganate and 13.5 L of ion-exchanged water were mixed, and the mixture was stirred for 10 minutes to obtain a slurry of lithium manganate (slurry concentration: 34% by mass). The liquid temperature at this time was 25° C. This slurry was passed through a wet type magnetic separator (magnetic power of the magnet at the site where the slurry is brought into contact: 17,000 G), and then the slurry was filtered under reduced pressure.

Subsequently, lithium manganate separated by filtration was heated in air at 200° C. (material temperature), and was dried for one whole day and night. Subsequently, classification was carried out using a classifier, and thus a powder (sample) of lithium manganate having a size under 325 mesh was obtained.

Comparative Example 3

A powder (sample) of lithium manganate was obtained in the same manner as in Example 1, except that regarding the drying conditions after the magnetic separation, drying was carried out for 5 hours by heating the material in air at 200° C. (material temperature), and the water vapor elimination rate was changed to 1.0 g/sec.

Comparative Example 4

Lithium carbonate, electrolytic manganese dioxide (TG weight reduction at the time of heating to 200° C. to 400° C.: 3.0%), and nickel hydroxide were weighed in the amounts indicated in Table 1 so that the total amount would be 10 kg, and the materials were introduced into 20 kg of water and 1.2 kg of a dispersant under stirring. The slurry was circulated in a wet type pulverizer (SC Mill SC220/70A-VB-ZZ, Mitsui Mining & Smelting Co., Ltd.) to pulverize the slurry at a speed of rotation of 1300 rpm for 45 minutes. Thus, the core particle size in the slurry was adjusted to 0.6 μm or less. The obtained slurry was dried with a spray thermal dryer (OC-16, Ohkawara Kakohki Co., Ltd.) at an atomizer rate of 24,000 rpm, a flow rate of 50 mL/min, and an inlet temperature of 190° C. Thus, a precursor having a core particle size of 15 μm was obtained.

The obtained precursor was filled in a calcination vessel (crucible made of alumina, size=length*width*height=10*10*5 (cm)), such that the ratio of the open area and the packing height (open area cm$^2$/packing height cm) would be 100. The apparent density of the raw material at this time was 1.1 g/cm³. The raw material was calcined for 72 hours at 950° C. in an electric furnace, and the calcination product was cracked with a shear crusher. Thus, a powder of spinel type lithium manganate (5 V-class spinel powder) was produced, and this was used as a 5 V-class spinel powder (sample).

(Inference)

From these test results, it could be confirmed that when a spinel type (Fd-3m) lithium transition metal oxide obtained after calcination is washed with a polar solvent, and then dried by heating to 300° C. to 700° C. in an atmosphere containing oxygen, the service life characteristics or high temperature cycle characteristics can be further enhanced.

Furthermore, as shown in Table 3, when a comparison is made between Example 5 and Comparative Example 4 in which 5 V-class spinel powders (samples) were produced, it could be confirmed that even for a 5 V-class spinel powder, when the powder is washed with a polar solvent, and then dried by heating to 300° C. to 700° C. in an atmosphere containing oxygen, the service life characteristics or high temperature cycle characteristics can be further enhanced.

TABLE 2

| | Example 1 | Example 2 | Example 3 | Example 4 | Example 6 | Example 7 | Example 8 | Example 9 | Comparative Example 1 | Comparative Example 2 | Comparative Example 3 |
|---|---|---|---|---|---|---|---|---|---|---|---|
| B (wt %) | 0.01 | 0.01 | 0.01 | 0.01 | <0.01 | <0.01 | <0.01 | <0.01 | 0.08 | 0.01 | 0.01 |
| SO4 (wt %) | <0.1 | <0.1 | <0.1 | <0.1 | <0.1 | <0.1 | <0.1 | <0.1 | 1.08 | <0.1 | <0.1 |
| S (wt %) | 0.02 | 0.01 | 0.02 | 0.01 | <0.01 | <0.01 | 0.02 | 0.01 | 0.36 | 0.03 | 0.03 |
| Na (ppm) | 30 | 40 | 40 | 30 | 30 | 40 | 30 | 30 | 400 | 30 | 40 |
| Amount of moisture (ppm) | 230 | 250 | 192 | 183 | 125 | 157 | 138 | 140 | 408 | 411 | 374 |
| 55° C. × 80% 45 min Degree of increase in amount of moisture (%) | 157 | 124 | 132 | 183 | 154 | 163 | 158 | 180 | 412 | 170 | 154 |
| Initial discharge capacity (negative electrode: Li/Li⁺) (mAh/g) | 102 | 103 | 102 | 102 | 103 | 103 | 103 | 102 | 103 | 102 | 102 |
| High temperature evaluation at 45° C. (negative electrode: C) Power output retention rate before and after 100 cycles | 99.5 | 98.8 | 99.0 | 99.4 | 99.6 | 99.7 | 99.8 | 99.8 | 98.0 | 97.0 | 98.5 |
| High temperature evaluation at 45° C. (negative electrode: C) Capacity retention ratio after 100 cycles | 91 | 88 | 89 | 90 | 92.4 | 94.2 | 94.0 | 95.2 | 87 | 86 | 87 |

TABLE 3

| | Example 5 | Comparative Example 4 |
|---|---|---|
| B (wt %) | | |
| SO4 (wt %) | — | — |
| S (wt %) | <0.1 | 0.9 |
| Na (ppm) | 0.02 | 0.3 |
| B (wt %) | 20 | 460 |
| Amount of moisture (ppm) | 230 | 350 |
| 55° C. × 80% 45 min Degree of increase in amount of moisture (%) | 153 | 235 |
| Initial discharge capacity (negative electrode: Li/Li⁺) (mAh/g) | 134 | 134 |
| High temperature evaluation at 45° C. (negative electrode: C) Power output retention rate before and after 100 cycles | 95.5 | 85.3 |
| High temperature evaluation at 45° C. (negative electrode: C) Capacity retention ratio after 100 cycles | 75 | 62 |

The invention claimed is:

1. A method for producing a positive electrode active material for lithium secondary batteries, the method consisting of washing a powder of a spinel type (Fd-3m) lithium transition metal oxide having an operating potential of about 5 V by substituting a portion of the Mn sites in LiMn₂O₄ with another 3d transition metal into contact with water and thereby forming a slurry; feeding the slurry thus obtained into a wet type magnetic separator, collecting magnetic substances that have attached to a magnet, and thereby removing the magnetic substances; filtrating the slurry after collecting magnetic substances to form a filtered composition; heating and drying to remove moisture in a single process in which heating the filtered composition to 300° C. or higher and less than 700° C. in an atmosphere containing oxygen while water vapor is exhausting at an average water vapor exhaust rate of 0.5 g/sec to 300 g/sec, wherein, after contact with the water, the slurry or the filtered composition is not heated to 700° C. or higher.

2. The method for producing a positive electrode active material for lithium secondary batteries according to claim 1, wherein in the drying, the material is heated by controlling the temperature to a temperature region lower than a primary oxygen release temperature.

3. The method for producing a positive electrode active material for lithium secondary batteries according to claim 1, wherein the magnetic power of the magnet used for the magnetic separation process is greater than or equal to 8,000 G and less than or equal to 17,000 G.

4. The method for producing a positive electrode active material for lithium secondary batteries according to claim 1, wherein pH of the water is greater than or equal to 5 and less than or equal to 9.

5. The method for producing a positive electrode active material for lithium secondary batteries according to claim 1, wherein the liquid temperature at the time of washing is higher than or equal to 5° C. and lower than or equal to 70° C. during washing.

6. The method for producing a positive electrode active material for lithium secondary batteries according to claim 1, wherein the mass ratio of the lithium transition metal oxide powder to the polar solvent is greater than or equal to 10 wt % and less than or equal to 70 wt % during washing.

7. The method for producing a positive electrode active material for lithium secondary batteries according to claim 1, wherein an average water vapor exhaust rate is 1.0 g/sec to 150 g/sec during drying.

\* \* \* \* \*